(12) United States Patent
Yang et al.

(10) Patent No.: US 8,866,600 B2
(45) Date of Patent: Oct. 21, 2014

(54) ELECTRONIC APPARATUS WITH HAPTIC FEEDBACK AND METHOD FOR PROVIDING HAPTIC FEEDBACK

(75) Inventors: Kae-Cherng Yang, Taoyuan County (TW); Chun-Hung Li, Taoyuan County (TW); Hsiang-Tai Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 348 days.

(21) Appl. No.: 13/340,112

(22) Filed: Dec. 29, 2011

(65) Prior Publication Data

US 2012/0188180 A1 Jul. 26, 2012

(30) Foreign Application Priority Data

Jan. 20, 2011 (TW) .............................. 100102168 A

(51) Int. Cl.
*G08B 6/00* (2006.01)
*G06F 3/01* (2006.01)

(52) U.S. Cl.
CPC ...................................... *G06F 3/016* (2013.01)
USPC ...................................................... 340/407.1

(58) Field of Classification Search
USPC ........................................... 340/407.1–407.2
See application file for complete search history.

(56) References Cited

U.S. PATENT DOCUMENTS

| | | | |
|---|---|---|---|
| 7,218,310 B2 | 5/2007 | Tierling et al. | |
| 7,791,588 B2 * | 9/2010 | Tierling et al. | ............... 345/156 |
| 2002/0030663 A1 * | 3/2002 | Tierling et al. | ............... 345/156 |
| 2005/0134561 A1 | 6/2005 | Tierling et al. | |
| 2006/0146038 A1 * | 7/2006 | Park et al. | ..................... 345/173 |
| 2007/0196801 A1 * | 8/2007 | Nagasaka et al. | ............. 434/262 |
| 2008/0143496 A1 | 6/2008 | Linjama | |
| 2008/0189588 A1 * | 8/2008 | Tanaka et al. | .................. 714/764 |
| 2009/0085878 A1 * | 4/2009 | Heubel et al. | ................. 345/173 |
| 2009/0292990 A1 * | 11/2009 | Park et al. | ..................... 715/702 |
| 2010/0182245 A1 | 7/2010 | Edwards et al. | |
| 2012/0081326 A1 * | 4/2012 | Heubel et al. | ................. 345/173 |
| 2012/0081327 A1 * | 4/2012 | Heubel et al. | ................. 345/173 |

FOREIGN PATENT DOCUMENTS

JP 09-066476 A 3/1997

OTHER PUBLICATIONS

Office Action issued by Japan Patent Office dated Mar. 5, 2013 with English translation.
Anonymous: "Dynamic range compression", Jan. 8, 2011, pp. 1-10, XP55023710, Wikipedia Retrieved from the Internet: URL:http://en.wikipedia.org/w/index.php?title=Dynamic_range_compression&oldid=406593483 [retrieved on Apr. 30, 2012] *p. 1-p.4*.

* cited by examiner

*Primary Examiner* — Srilakshmi K Kumar
*Assistant Examiner* — Carl Adams
(74) *Attorney, Agent, or Firm* — Rabin & Berdo, P.C.

(57) ABSTRACT

An electronic apparatus with haptic feedback and a method for providing haptic feedback are provided. The method includes the following steps. An actuation unit is provided to generate haptic feedback. In response to at least a haptic command, a control value is dynamically generated to control the actuation unit to generate haptic feedback, wherein dynamic range compression is applied to dynamically generate the control value so as to control the magnitude of haptic feedback to be substantially within a vibration range.

23 Claims, 12 Drawing Sheets

ELECTRONIC APPARATUS WITH HAPTIC FEEDBACK AND METHOD FOR PROVIDING HAPTIC FEEDBACK

This application claims the benefit of Taiwan application Serial No. 100102168, filed Jan. 20, 2011, the subject matter of which is incorporated herein by reference.

BACKGROUND

1. Technical Field

The disclosure relates in general to an electronic apparatus, and more particularly to a portable device with haptic feedback.

2. Description of the Related Art

Portable devices, such as smart phone, personal digital assistant (PDA), and multimedia player, provide versatile functions to meet users' various needs. Whether a portable device provides a simple and friendly user interface to create pleasant user experience greatly or not affects a user's willingness of using this particular device.

Single or multi-touch user interface, which has become mainstream user interface, makes the portable device easier to use. The portable device with touch sensitive function still cannot satisfy the user's need for man-machine interaction, and therefore some manufacturers develop haptic feedback on electronic products to provide simple vibration function. However, the haptic feedback technology still has much to improve so as to bring the user better user experience.

SUMMARY

The disclosure is directed to an electronic apparatus with haptic feedback and a method for providing haptic feedback. The haptic feedback function of the electronic apparatus of an embodiment has a dynamic range compression mechanism by which the haptic feedback generated from the electronic apparatus generates vibration effect to improve user experience. Thus, the electronic apparatus can simulate delicate and structured haptic feedback effect. Moreover, under certain circumstances, such as several different haptic commands being combined, the haptic command can avoid distortion which occurs when the control value is outside the dynamic range.

According to a first aspect of the present disclosure, a method for providing haptic feedback is provided. The method includes the following steps. An actuation unit is provided to generate haptic feedback. In response to at least a haptic command, a control value is dynamically generated to control the actuation unit to generate haptic feedback, wherein dynamic range compression is applied to dynamically generate the control value so as to control the magnitude of haptic feedback to be substantially within a vibration range.

According to a second aspect of the present disclosure, an electronic apparatus with haptic feedback is provided. The electronic apparatus includes an actuation unit and a control unit. The actuation unit generates haptic feedback. The control unit is coupled to the actuation unit, and dynamically generates a control value to control the actuation unit to generate haptic feedback in response to at least a haptic command, wherein the control unit applies dynamic range compression to dynamically generate the control value so as to control the magnitude of haptic feedback to be substantially within a vibration range.

According to a third aspect of the present disclosure, an electronic apparatus with haptic feedback is provided. The electronic apparatus includes an actuation unit, a control unit, and a dynamic range compression unit. The actuation unit generates haptic feedback. The dynamic range compression unit is coupled to the control unit and the actuation unit, and dynamically generate a control signal to control the actuation unit to generate haptic feedback in response to at least a haptic command, wherein the dynamic range compression unit applies dynamic range compression to dynamically generate the control signal so as to control the magnitude of haptic feedback to be substantially within a vibration range.

The above and other aspects of the disclosure will become better understood with regard to the following detailed description of the non-limiting embodiment(s). The following description is made with reference to the accompanying drawings.

DETAILED DESCRIPTION

Figure 1:
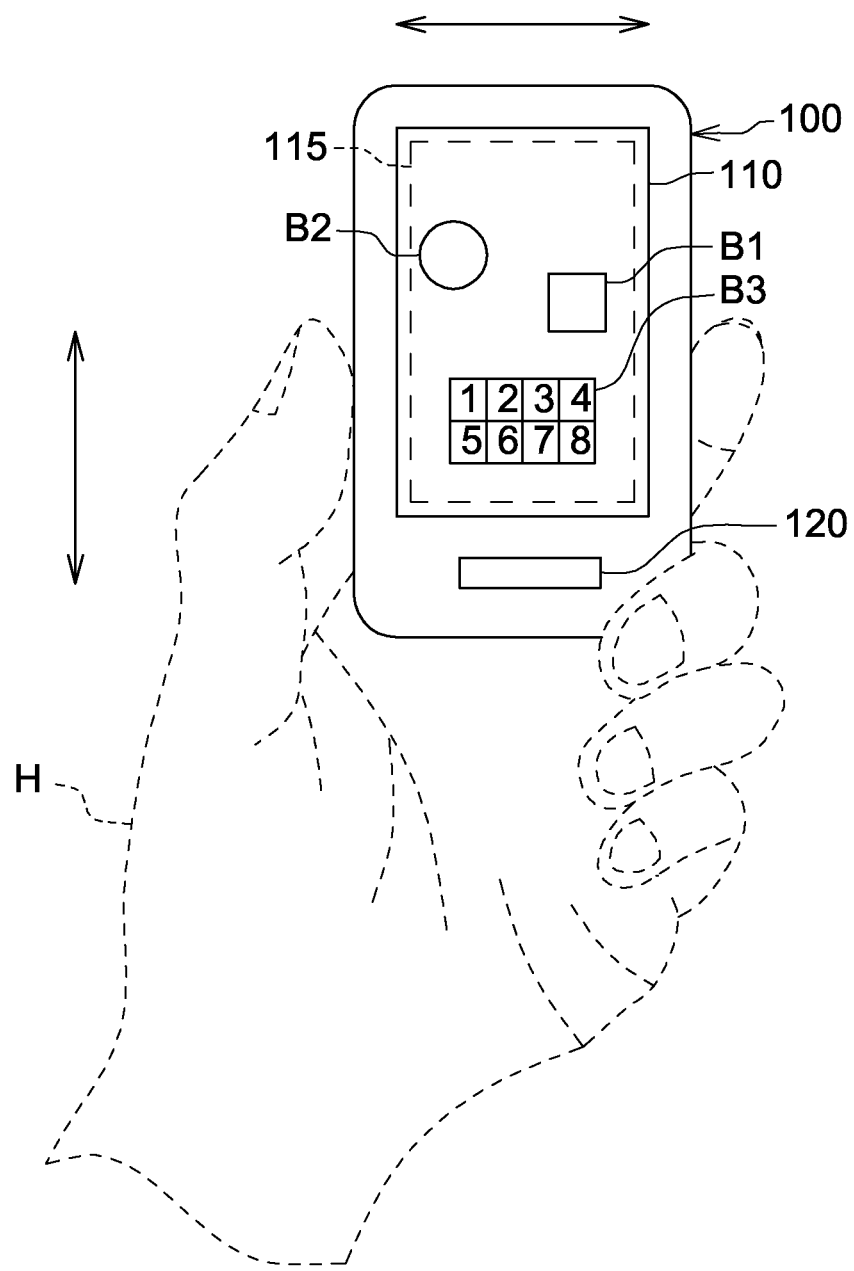
FIG. 1 shows an electronic apparatus with haptic feedback according to an embodiment of the invention.

FIG. 1 shows an electronic apparatus with haptic feedback according to an embodiment of the invention. The electronic apparatus 100 of FIG. 1 can be realized by a mobile computational device such as a mobile phone, multimedia player, a personal digital assistant, an e-book, a tablet PC, a digital camera and other portable devices. The electronic apparatus 100 controls the actuation unit 120 to provide haptic feedback function. The haptic feedback function provided by the electronic apparatus 100 further has a mechanism of dynamic range compression which can prevent the circuit for implementing the haptic feedback function from generating distortion due to the restriction on the analog or digital signal output of the circuit. Such distortion usually results in annoying haptic feedback and unpleasant user experiences. As indicated in the following embodiments, through the mechanism of dynamic range compression, the electronic apparatus 100 reduces the distortion and improves user experience.

To make the descriptions easy to understand, here below the haptic feedback generated by the actuation unit 120 is vibration perceivable to the user. For example, the wave pattern W of FIG. 2A denotes an example of haptic feedback perceivable to the user or the testing element, wherein the haptic feedback envelope curve C0 varies within a vibration range. For example, the envelope curve C0 is less than or equal to the maximum value MAX of the amplitude. The actuation unit can be realized by a vibration element of one or multiple devices disposed in the electronic apparatus 100, wherein the vibration element generates user perceivable vibration on the totality or part of apparatus, for example, the vibration is generated on the touch panel or the casing. A haptic command denotes or includes a command controlling the magnitude of haptic feedback. For the sake of description, haptic feedback is denoted by a corresponding envelope curve thereof.

Prior to the exemplification of applying dynamic range compression by the electronic apparatus 100, some situations of haptic feedback distortion that may occur to the electronic apparatus are exemplified first. For example, there may have more than two instances of haptic feedback (such as more than two instances of collision) concurrently occurring to the user interface 115 (such as the number key of an object B3) disposed on the display 110 of the electronic apparatus 100 of FIG. 1. Meanwhile, the instances of haptic feedback corresponding to the two haptic commands will be combined. Distortion would occur when the haptic feedback corresponding to the combined instances of haptic feedback theoretically exceed the restriction on the analog or digital signal outputted by the circuit for implementing the haptic feedback function or the restriction on the haptic feedback that can be generated by the actuation unit 120. In practice, the above situations can be resolved by compulsory restriction or hard clipping method mechanism; that is, the value greater than the upper limit is substituted by the upper limit and/or the value lower than the lower limit is substituted by the lower limit. However, such substitution probably results in perceivable non-linear distortion and generates annoying haptic feedback.

Figure 2A:
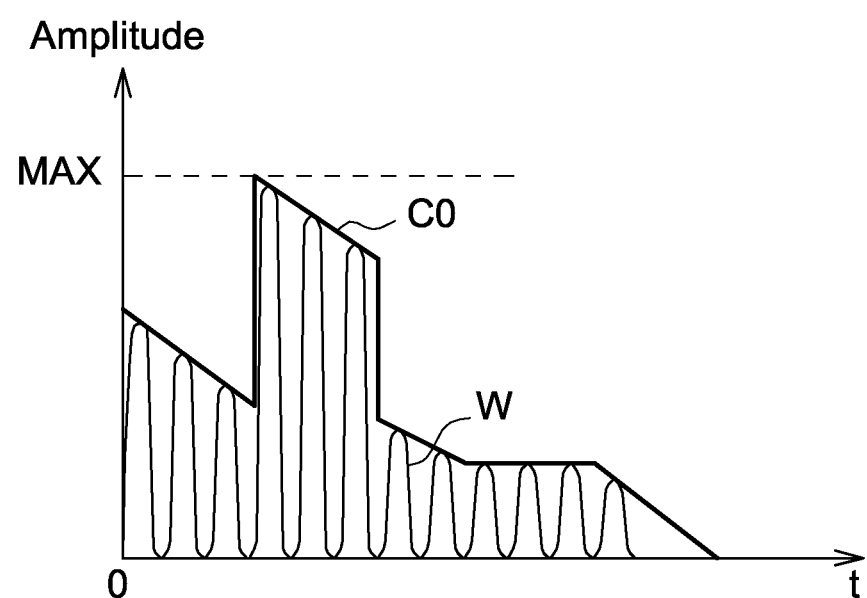
FIG. 2A shows an example of corresponding haptic feedback of a haptic command.
Figure 2B:
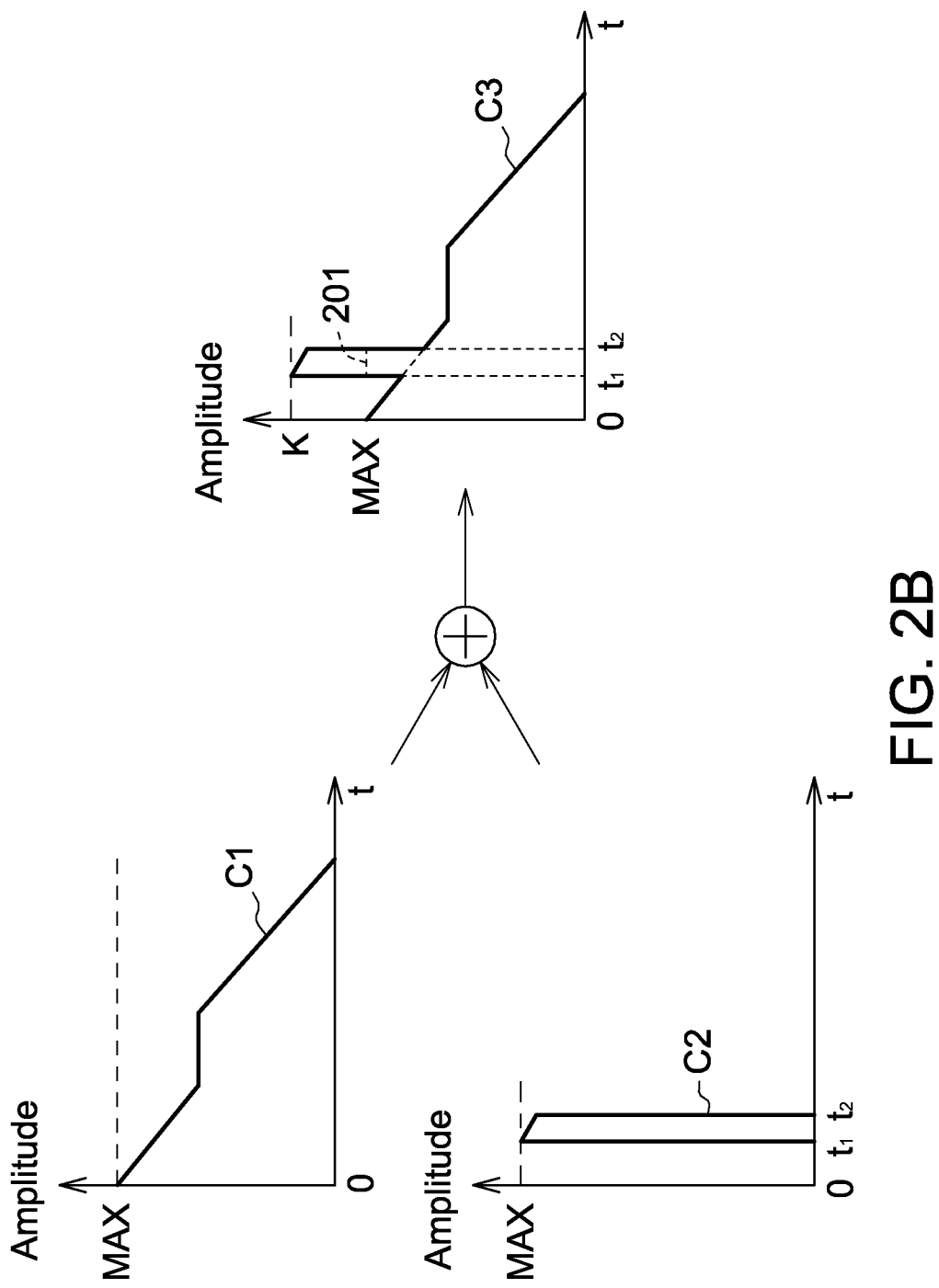
FIG. 2B shows an example of corresponding haptic feedback of two combined haptic commands.

For example, the objects B1 and B2 of the user interface 115 respectively denote an explosion event and a shooting event. A program such as a game program executed by the electronic apparatus 100 generates two haptic commands in response to the two corresponding events of the two objects B1 and B2 for driving the actuation unit 120 to provide the user with haptic perception presented by the two objects B1 and B2. As indicated in FIG. 2B, suppose the envelope curves C1 and C2 are the waves (haptic feedback) corresponding to the two haptic commands and are both below the maximum value MAX. When adding the two envelope curves, since the time interval between time points $t_1$ and $t_2$ corresponds to the shooting event (the envelope curve C2) presented by the object B2, in theory, the envelope curve C3 will exceed the maximum value MAX and reach the value K within this time interval. Due to the restriction on the circuit or digital processing, the haptic feedback between time points $t_1$ and $t_2$ can only reach the maximum value MAX as indicated in 201. If the shooting event occurs between time point $t_1$ and time 0, the above hard clipping method will make it even harder to differentiate between the corresponding effects of haptic feedback of the objects B1 and B2 after adding the two envelope curves C1 and C2, and the user may be unable to perceive the corresponding haptic feedback of the latter event. If more shooting events or other events occur within or after the time interval between time points $t_1$ to $t_2$, the haptic feedback corresponding to multiple haptic commands will be more obscure and harder to perceive. Thus, the user may consider the haptic feedback of the electronic apparatus 100 has poor effect and lacks vivid feeling of use.

Figure 2C:
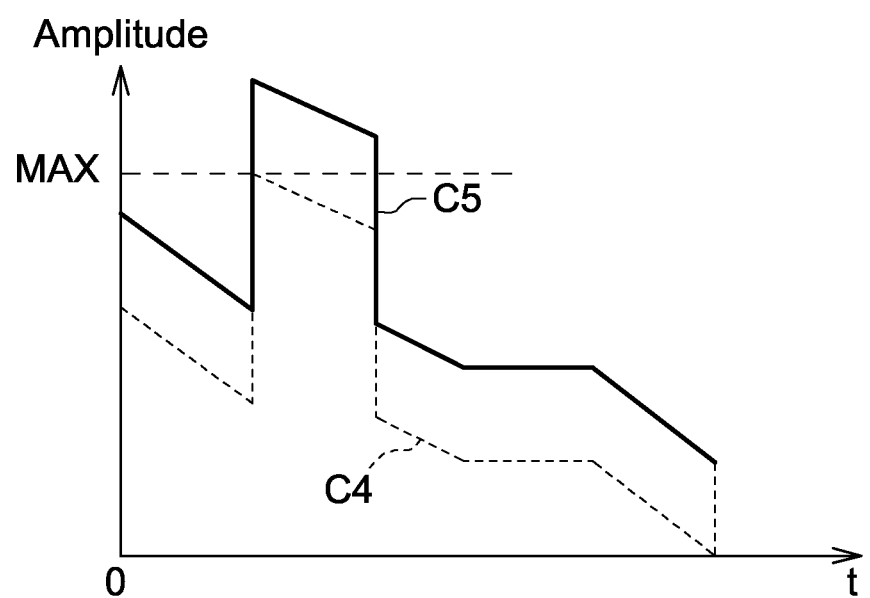
FIG. 2C shows an example of corresponding haptic feedback of a haptic command and amplified corresponding haptic feedback thereof.

Moreover, it is also possible that the corresponding haptic feedback of a haptic command may exceed the threshold value only within a certain time interval. For example, the envelope curve C4 of FIG. 2C, which denotes the haptic feedback corresponding to a haptic command, is below the threshold value MAX and corresponds to a certain event, such as an event of a game program, wherein the event occurs 10 m away from the user. The distance of the event affects the magnitude of haptic feedback. Suppose the event occurs within 5 m to the user, the haptic feedback will be amplified. For example, the envelope curve C5 of FIG. 2C exceeds the threshold value MAX within a period of time. The above practice of compulsory restriction normally results in non-linear distortion and annoying haptic feedback.

Figure 3A:
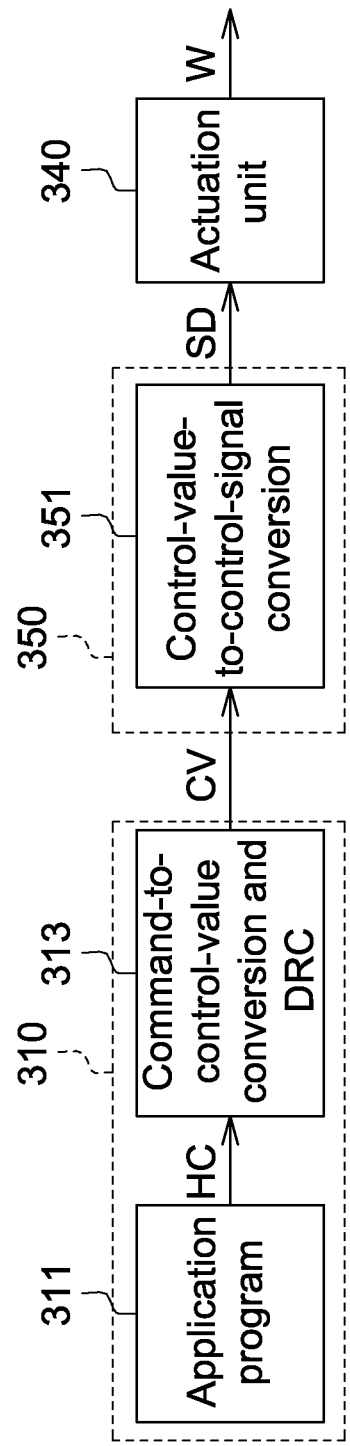
FIG. 3A shows a system for providing haptic feedback according to an embodiment of the invention.

The electronic apparatus 100 of the present embodiment has a mechanism of dynamic range compression mechanism which prevent the circuit for implementing the haptic feedback function from generating distortion due to the output restriction on the analog or digital signal of the circuit. Referring to FIG. 3A, a system for providing haptic feedback according to an embodiment is shown. The haptic feedback system 300 realized by such as the aforementioned electronic apparatus 100 includes a control unit 310 and an actuation unit 340. The control unit 310 is such as a microprocessor. In FIG. 3A, an application program 311 executed by the control unit 310 generates a haptic command HC, and the control unit 310 also executes command-to-control-value conversion and dynamic range compression (DRC) 313. In response to at least a haptic command HC (that is, a haptic command or a combination of a plurality of haptic commands), the command-to-control-value conversion and DRC processing 313 dynamically generates a control value CV. The control value CV is dynamically generated through dynamic range compression so as to control the magnitude of haptic feedback to be substantially within a vibration range. The control value CV denotes the amplitude value of the wave pattern of haptic feedback corresponding to the aforementioned at least a haptic command. For example, the amplitude value of the wave pattern W of FIG. 2A is a numeric series such as a discrete series. The control value CV can also denote one or multiple parameters related to the control of the magnitude of haptic feedback (such as the intensity and amplitude of haptic feedback) or other parameters related to the control of haptic feedback. The control value CV controls the magnitude of haptic feedback generated by the actuation unit 340. The command-to-control-value conversion and DRC processing 313 can be implemented by one or multiple program modules executed by the control unit 310 (such as a driving program or a system program module) or an application program interface used by an application program.

The haptic command HC can be generated by the application program 311, the hardware element or firmware of the electronic apparatus 100, or other software, wherein the software is such as an operating system, an application program or a driving program executed by the electronic apparatus 100, and examples of the software include game program, office program or any form of user interface. The haptic command HC corresponds to an object displayed on the user interface 115 of the electronic apparatus 100 of FIG. 1 or an interactive event. The haptic command may also correspond to at least a touch input received by the user interface 115 of the electronic apparatus 100. In response to the needs for the application program of system program, one or multiple haptic commands can be generated, so that the haptic feedback can be felt by the user or used for man-machine interaction. In addition, when the user grabs the electronic apparatus 100, the user interface 115 simulates and provides the hand H with a vivid feeling as if the hand were touching a real object and could feel the situations such as the object B2 descending or colliding with the object B1.

The haptic command HC has several implementations. For example, the haptic command includes the information of amplitude indicating the magnitude of haptic feedback, frequency and duration. Or, the haptic command includes: an index denoting one of multiple haptic feedback patterns such as squared wave and sine wave, or the vibration pattern denoting flash, explosion or collision. For example, play effect 1 indicates the generation of a certain pattern of haptic feedback. In the present example, the command-to-control-value conversion and DRC processing 313 is executed, and, according to the haptic feedback pattern denoted by the haptic command, continuously outputs a control value corresponding to the pattern within a period of time to control the amplitude and frequency of the haptic. The haptic command includes other parameters such as the parameters related to the distance to the location of the event in the example of FIG. 2C. The implementations of the haptic command are not limited to the above exemplifications. Regardless of what implementation is used, a haptic command or a combination of multiple haptic commands needs to be converted into or denoted as a control value controlling the actuation unit 120 to provide haptic feedback through command-to-control-value conversion and DRC processing 313.

A control value CV, which can be presented by a digital or analog control signal, is outputted to a digital or analog actuation unit 340. As indicated in FIG. 3A, the control value CV is converted into a control signal SD by a conversion unit 350, and the control signal SD is then received by the actuation unit 340. The conversion unit 350 executes the control-value-to-control-signal conversion processing 351. In another example, if the actuation unit 340 can receive the control value CV, then the conversion unit 350 does not need to be used. In another example, when the actuation unit 340 receives a control signal of other forms, such as a voltage signal or a pulse width modulation signal, the conversion unit 350 can perform corresponding conversion according to the form of the control signal, and the implementation of the control value CV or the control signal is not limited to the above exemplifications.

Figure 3B:
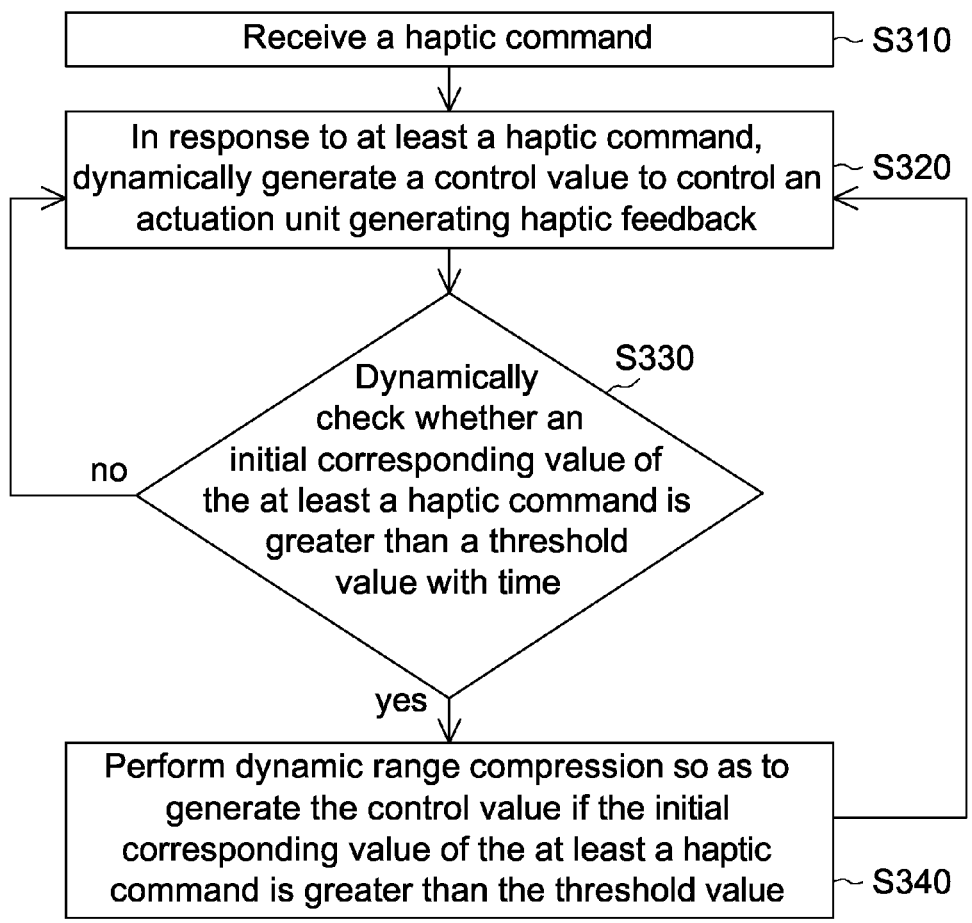
FIG. 3B shows a flowchart of a method for providing haptic feedback used in the electronic apparatus of FIG. 1 according to an embodiment of the invention.

In addition, an embodiment of a method for providing haptic feedback is provided. The method includes the following steps: (a) An actuation unit, such as the actuation unit 120 of the electronic apparatus of FIG. 1 100, is provided to generate haptic feedback. (b) A control value is dynamically generated by such as the electronic apparatus of FIG. 1 100 in response to at least a haptic command to control the actuation unit to generate haptic feedback, wherein dynamic range compression is applied to dynamically generate the control value so as to control the magnitude of haptic feedback to be substantially within a vibration range. FIG. 3B shows a flowchart of a method for providing haptic feedback used in the electronic apparatus of FIG. 1 according to an embodiment of the invention. Referring to FIG. 3B. In step S310, a haptic command is received, wherein in the present example, multiple haptic commands can be received either concurrently or sequentially by such as the control unit 310. Step (b) of the method for providing haptic feedback is implemented in steps S320-S340. As indicated in step S320, a control value is dynamically generated in response to at least a haptic command to control the actuation unit to generate haptic feedback. As indicated in step S330, whether the initial corresponding value of the at least a haptic command is greater than a threshold value is dynamically checked with time. When the at least a haptic command denotes a haptic command, the initial corresponding value can be regarded as the amplitude value of the haptic command according to a certain haptic feedback pattern or the value of one or multiple parameters related to vibration. For example, the envelope curve C0 of FIG. 2A and the envelope curves C4 and C5 of FIG. 2C respectively correspond to the initial corresponding value of a haptic command within a certain period of time. When the at least a haptic command denotes multiple haptic commands, the initial corresponding value of at least a haptic command is the result of computation or a combination of the initial corresponding values of the haptic commands, wherein the computation or combination is a function operation such as weighted sum or linear combination of the initial corresponding values. As indicated in FIG. 2B, the envelope curves C1 and C2 correspond to two initial corresponding values of haptic commands, and the envelope curve C3 corresponds to the initial corresponding values of two combined haptic commands such as the result of adding the two envelope curves C1 and C2. In step S330, if an initial corresponding value of at least a haptic command is substantially greater than a threshold value such as the threshold value MAX, then the method performs step S340, dynamic range compression is applied to adjust the initial corresponding value so as to control magnitude of haptic feedback to be substantially within a vibration range. If the determination in step S330 is negative, then the method returns to step S320. Following step S340, the method can return to the step S320.

Dynamic range compression is applied in the step S340. Dynamic range compression includes adjusting the initial corresponding value to generate a control value according to the at least a haptic command, the initial corresponding value and a gain, so as to control the magnitude of haptic feedback to be substantially within vibration range. Moreover, in the course of adjusting the initial corresponding value to generate control value, the gain value may vary so as to implement various mechanisms of dynamic range compression such as attack mechanism, release mechanism, input-look-ahead mechanism or soft clipping method. In addition, the above mechanisms can have various combinations such as the combination of attack and release mechanism, and the combination of input-look-ahead and release mechanism. In addition, soft clipping method can be used in the above combinations.

Dynamic range compression of the step S340 is described with the examples of FIGS. 4A to 4D. Suppose the control value corresponding to the haptic command is proportional to the intensity of haptic feedback. The envelope curve denotes the dynamic variation in the control value of the haptic command with time. The situations of other implementations of haptic command can be obtained by analogy.

Figure 4A:
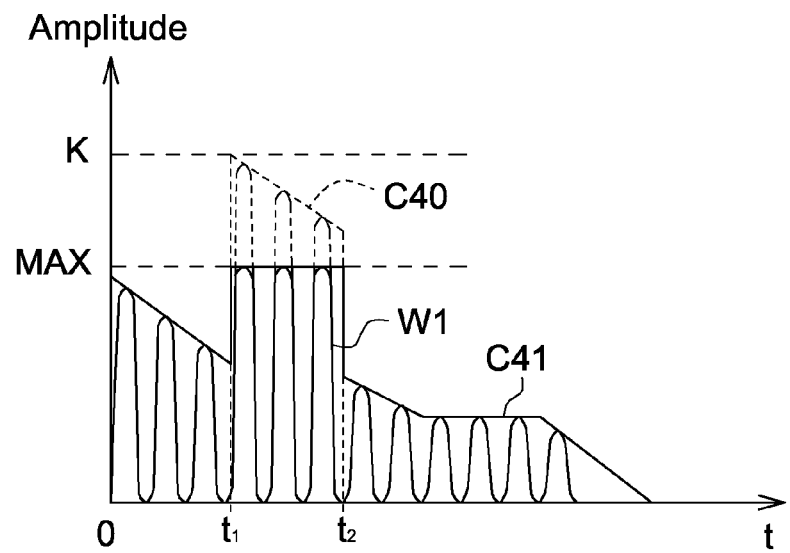
FIG. 4A shows an example of dynamic range compression using soft clipping method.
Figure 9:
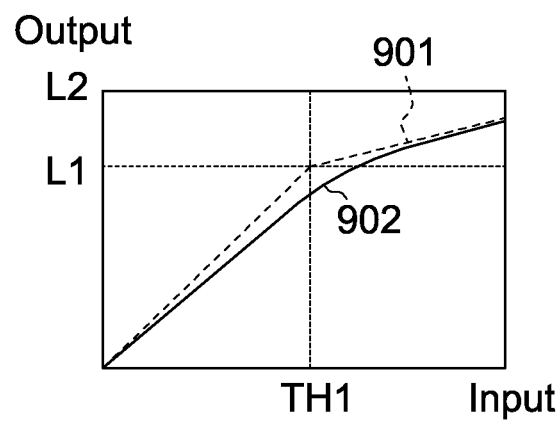
FIG. 9 shows an I/O characteristics diagram of performing dynamic range compression to the initial corresponding value of a haptic command through soft restriction.

FIG. 4A shows an example of dynamic range compression using soft clipping method. As indicated in FIG. 4A, in step S330, if the initial corresponding value of at least a haptic command is greater than a threshold value MAX within time points $t_1$ to $t_2$ and the corresponding envelope curve is the envelope curve C40, then, the method proceeds to step S340, dynamic range compression is applied, for example, soft restriction or soft clipping method of FIG. 9 is used so as to generate a control value accordingly. Thus, soft clipping method is used to adjust the actual variation in the initial corresponding value of at least a haptic command within the time interval between time points $t_1$ to $t_2$, so that both the wave pattern when the initial corresponding value exceeds the threshold value and the wave pattern when the initial corresponding value steps down to the threshold value become smoother and are below the threshold value MAX as indicated in the wave pattern W1, and the corresponding envelope curve is the envelope curve C41. In addition, the step of applying dynamic range compression uses soft clipping method and hard/soft knee method so as to generate a control value accordingly. For the sake of illustration or clarification, here below the wave pattern is not illustrated, and the envelope curve is used instead for description.

Figure 4B:
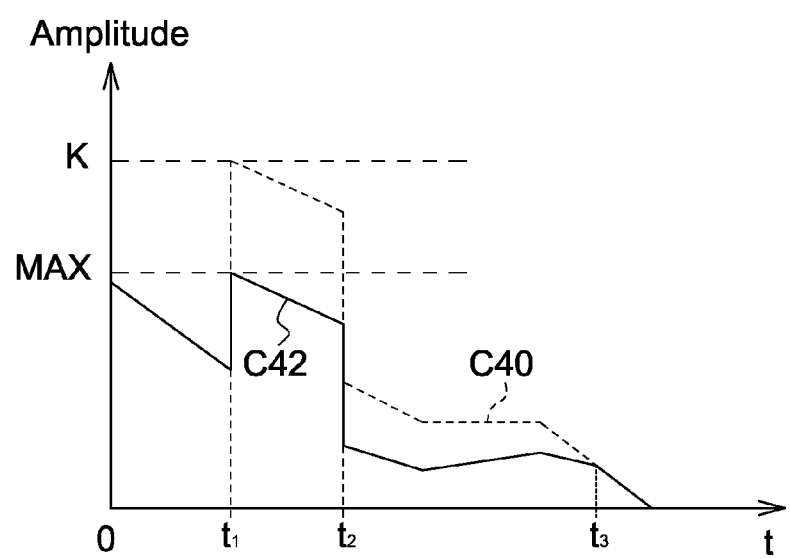
FIG. 4B shows an example of dynamic range compression using release mechanism.

FIG. 4B shows an example of dynamic range compression using release mechanism. In the course of dynamic range compression, when the adjusted initial corresponding value of the at least a haptic command is less than the threshold value, the gain is released so that the gain gradually increases within a period of time. As indicated in FIG. 4B, in step S330, if the initial corresponding value of at least a haptic command is dynamically checked with time and is found to be greater than a threshold value MAX between time points $t_1$ to $t_2$, then the method proceeds to step S340, dynamic range compression is applied to generate a control value according to the at least a haptic command, an initial corresponding value and a gain value such as 1/(K/MAX). For example, the initial corresponding value of at least a haptic command is multiplied by 1/(K/MAX), and the obtained result (as indicated in the envelope curve C42 between time points t1 to t2) falls below the threshold value MAX, so the control value of the at least a haptic command is generated accordingly. After time point $t_2$, the initial corresponding value of at least a haptic command is less than the threshold value MAX, so the present example further adopts release mechanism to gradually increase the gain value within a period of time for the envelope curve C42 to gradually approach the envelope curve C40 until time point $t_3$. Thus, due to use of release mechanism, the variation in the envelope curve C42 between time points $t_2$ to $t_3$ is significantly different from the variation between time point $t_2$, and is not the same with the variation in the envelope curve C40 between time points $t_2$ to $t_3$. Therefore, when the at least a haptic command is multiple haptic commands, the effect of combined corresponding instances of haptic feedback is easier to be perceived by the user, hence achieving superior user experience of haptic feedback.

Figure 4C:
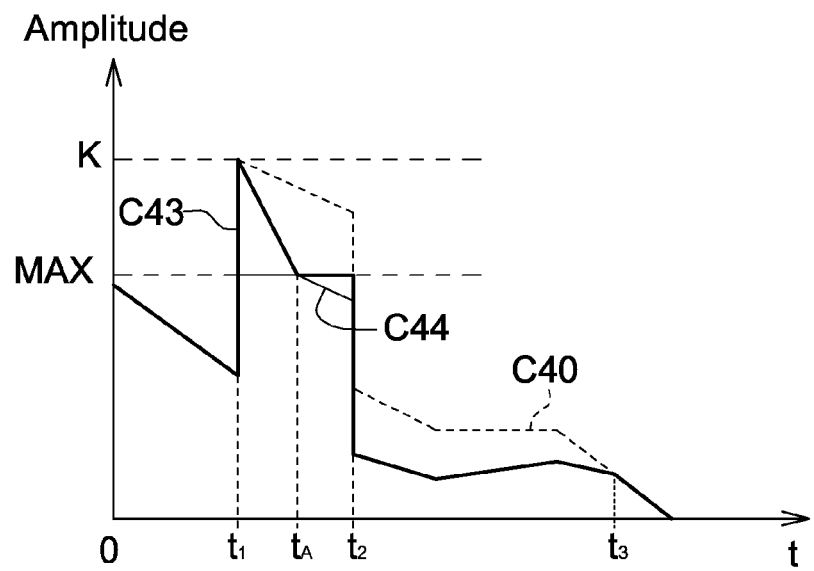
FIG. 4C shows an example of dynamic range compression using attack and release mechanism.

FIG. 4C shows an example of dynamic range compression using attack and release mechanism. Likewise, at time point $t_1$, the initial corresponding value of at least a haptic command exceeds the threshold value MAX, so dynamic range compression is applied. Firstly, attack mechanism is used at time point $t_1$, and release mechanism is used after time point $t_2$. When attack mechanism is used, the gain diminishes within a period of time until the adjusted initial corresponding value of the at least a haptic command is less than the threshold value. Attack mechanism can be implemented in many ways, and is exemplified by analog processing and digital processing below. However, the implementation of attack mechanism is not limited to the above exemplifications. In terms of analog processing, if the actuation unit allows the actuation unit can be controlled to make the control value exceed the threshold value MAX within the time interval between time points $t_1$ to $t_4$ and then gradually step down to the threshold value MAX within a time interval such as time points $t_1$ to $t_4$ as indicated in the envelope curve C43. On the other hand, since digital processing does not allow the control value to exceed the threshold value, in contrast to the above analog processing, the envelope curve C44 maintains at or approaches the threshold value MAX within a time interval such as between time points $t_1$ to $t_4$. Next within the time interval between time points $t_4$ to $t_2$, the envelope curve C44 indicates the initial corresponding value of at least a haptic command multiplied by a gain value less than 1 is used to generate a control value, wherein the initial corresponding value of at least a haptic command is still greater than the threshold value MAX. Following time point $t_2$, the initial corresponding value of at least a haptic command is less than the threshold value MAX. In the present example, release mechanism is further used to gradually increase the gain value within a period of time and make the envelope curve C44 gradually approach the envelope curve C40 until time point $t_3$.

Figure 4D:
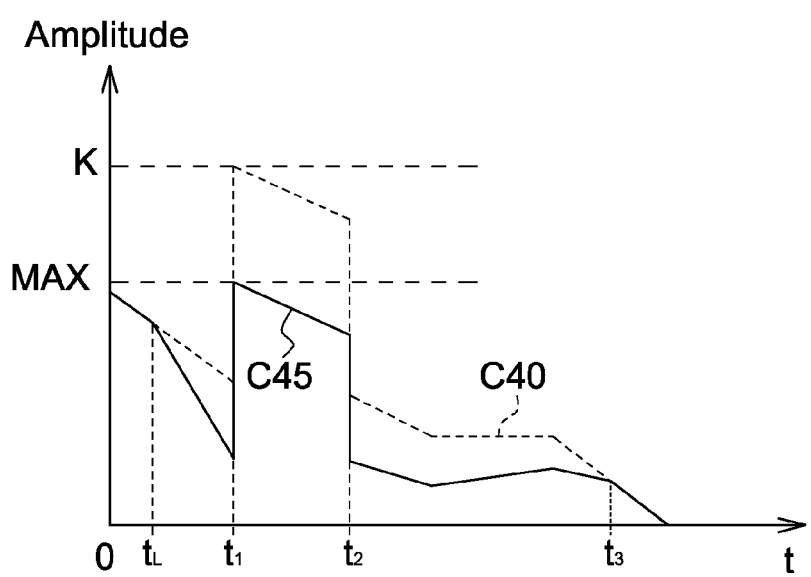
FIG. 4D shows an example of dynamic range compression using input-look-ahead mechanism.

FIG. 4D shows an example of dynamic range compression using input-look-ahead mechanism. The present example uses input-look-ahead mechanism to simulate and look ahead the variation in the initial corresponding value of at least a haptic command by way of temporary storing or delaying the initial corresponding value so as to dynamically generate a control value. In step S330, there are two situations: ones to dynamically check the variation in the initial corresponding value of at least a haptic command with time, and the other is to check the variation in the haptic command which occurs concurrently. No matter which situation applies, dynamic range compression using input-look-ahead mechanism includes steps (i) to (k) described below. (i) Generating an initial corresponding value of at least a haptic command and temporarily storing the initial corresponding value. (j) Dynamically checking with time whether a current initial corresponding value and the temporarily stored initial corresponding value are greater than a threshold value. (k) Performing dynamic range compression on the current initial corresponding value and the temporarily stored initial corresponding value to generate the control value so as to control the magnitude of haptic feedback to be substantially within vibration range if the current initial corresponding value exceeds the threshold value.

For example, the electronic apparatus 100 allows the haptic command to be delayed (for such as 100 ms). Thus, the initial corresponding value of the at least a haptic command is received and temporarily stored in the delay buffer, and the initial corresponding value is delayed and then outputted to the actuation unit. In step S330, apart from the current initial corresponding value of the at least a haptic command, the delayed initial corresponding value of the delay buffer is also checked. Thus, the next processing situation as well as what type of dynamic range compression will be applied with respect to the delayed control value in step S340 can also be predicted. That is, when the current initial corresponding value (such as corresponding to time point $t_1$) exceeds the threshold value, dynamic range compression is performed on the current initial corresponding value and the delayed initial corresponding value (such as corresponding to time point $t_L$ being prior to time point $t_1$) to generate a control value (such as the part of the envelope curve C45 between time points $t_L$ to $t_1$) so as to control the magnitude of haptic feedback to be substantially within the vibration range.

Referring to FIG. 4D. In step S330, the input-look-ahead feature can be used. When processing the initial corresponding value of the period before time point $t_1$, since it is predicted that the initial corresponding value of at least a haptic command at time point $t_1$ will exceed the threshold value MAX, the initial corresponding value of at least a haptic command starts to be adjusted at time point $t_L$ so as to generate the control value. For example, the initial corresponding value is multiplied by a diminishing value or a gain value G. If the gain value G starts to approach the value MAX/K from the value 1 within the time interval between time points $t_L$ to $t_1$, then the envelope curve C45 can be restricted to be below the threshold value MAX at time point $t_1$. According to the comparison between the envelope curves C45 and C40 at the time interval between time points $t_L$ to $t_1$, when the envelope curve C40 exceeds the threshold value MAX around time point $t_1$, the control value corresponding to the envelope curve C45 already varies significantly, so the user can have a vivid feeling of haptic feedback.

After time point $t_2$, the envelope curve C40 is already less than the threshold value. Since the initial corresponding value of at least a haptic command is still multiplied by a coefficient less than 1, the haptic feedback signal will be too small. Meanwhile, release mechanism can be used to gradually increase the multiplied coefficient (that is, the gain). For example, the gain value G is increased to gradually approach 1 from the value MAX/K. Release mechanism of the present example is similar to the method of FIG. 4B, and the similarities are not repeated here.

With respect to two concurrent haptic commands, if the patterns denoting two default instances of haptic feedback are the haptic commands corresponding to the envelope curves C1 and C2 as indicated in FIG. 2B, then the input-look-ahead effect can also be obtained by checking the two situations of the variation in the concurrent haptic commands. In practice, whether the haptic feedback pattern generated by the combination of two haptic commands between the windows within a time interval exceeds the threshold value MAX is checked according to the above example of using the delayed buffer, wherein the delay time is changed to a time interval, and the delayed buffer is changed to a buffer. Then, when generating a control value, the initial corresponding value of the envelope curve C3 is adjusted in the same manner as in the input-look-ahead method so as to achieve an effect similar to the time interval between time point $t_L$ to $t_1$ of FIG. 4D. The above step (k) of dynamically checking with time whether the current initial corresponding value and the temporarily stored initial corresponding value are greater than the threshold value can also be regarded as the situation of checking the variation in the concurrent haptic commands. The magnitude of haptic feedback generated in this way can enhance the gap between the haptic feedback effect of the shooting event corresponding to the object B2 and the haptic feedback effect of the explosion event corresponding to the object B1. Thus, the user can feel a structured, multi-layered effect of haptic feedback.

According to the above FIGS. 4A to 4D and examples, the method for providing haptic feedback of the above embodiments effectively reduces distortion and enhances users' haptic experience.

Figure 5A:
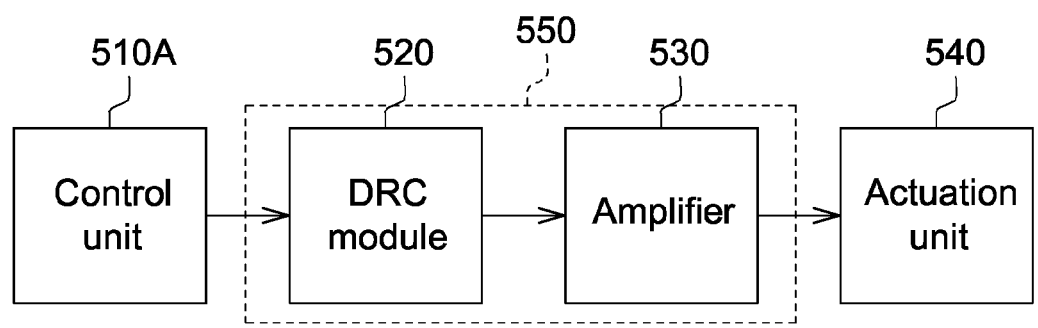
FIGS. 5A and 5B show block diagrams of embodiments of an electronic apparatus with haptic feedback.
Figure 5B:
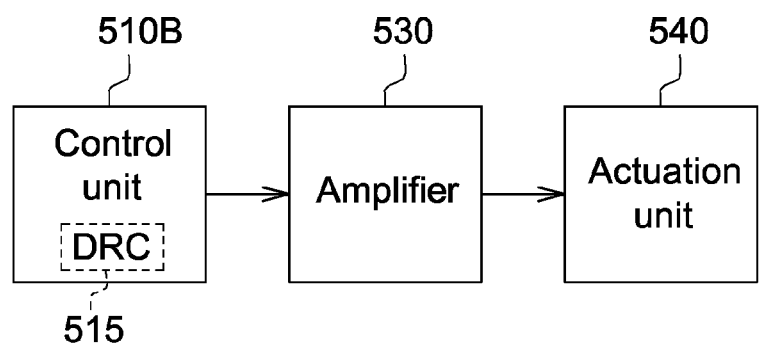

Referring to FIGS. 5A and 5B, block diagrams of embodiments of an electronic apparatus with haptic feedback are shown. As indicated in FIG. 5A, the electronic apparatus 100 with haptic feedback includes a control unit 510A, a dynamic range compression module 520, an amplifier 530 and an actuation unit 540. The control unit 510A, realized by such as a microprocessor of the electronic apparatus 100, receives a haptic command, wherein the generation and implementation of the haptic command can be realized in many different ways as disclosed above. The dynamic range compression module 520 is coupled to the control unit 510A and the actuation unit 540. In response to at least a haptic command, the dynamic range compression module 520 dynamically generate a control signal to control the actuation unit 540 to generate haptic feedback, wherein the dynamic range compression module 520 applies dynamic range compression to dynamically generate the control signal so as to control the magnitude of haptic feedback to be substantially within a vibration range. The dynamic range compression module 520, realized by such as a micro-controller, can be used to implement all or part of the functions of steps S320 to S340 of FIG. 3B in response to the received haptic command so as to dynamically generate a control value accordingly, wherein the control value can be presented in many different ways such as by a digital control signal or an analog control signal. The dynamic range compression module 520, such as the 8051 micro-controller, outputs the control signal, and enables the amplifier 530 to generate a driving signal for driving the actuation unit 540. Furthermore, the dynamic range compression module 520 and the amplifier 530 can be combined as a module or a chip and become a dynamic range compression unit 550. The dynamic range compression module 520 can implement the above functions of steps S320 to S340 by way of programming.

In addition, the control unit 510A and the dynamic range compression module 520 can be implemented by a control unit such as a microprocessor or a micro-controller.

FIG. 5B shows another embodiment of the electronic apparatus with haptic feedback. In the present embodiment, the electronic apparatus 100 such as includes a control unit 510B, an amplifier 530 and an actuation unit 540, wherein the amplifier 530 is coupled between the control unit 510B and the actuation unit 540. For example, in response to at least a haptic command, the control unit 510B dynamically generates a control value to control the actuation unit 540 to generate haptic feedback, wherein dynamic range compression is applied to dynamically generate a control value with time so as to control the magnitude of haptic feedback to be substantially within a vibration range. In an embodiment, the control unit 510B is realized by such as a microprocessor. Thus, related dynamic range compression or the method of FIG. 3B can be implemented as a software module such as the dynamic range compression (DRC) module 515 of FIG. 5B to achieve the above function of dynamic range compression. In addition, when the initial corresponding value of at least a haptic command is greater than a threshold value, the control unit 510B applies dynamic range compression to dynamically adjust the initial corresponding value to generate a control value so as to control the magnitude of haptic feedback to be substantially within vibration range as indicated in FIGS. 4A to 4D.

As indicated in FIG. 5A or 5B, if the actuation unit 540 can directly receive a control value, then the amplifier 530 does not need to be used. In another example, the control unit 510B outputs the control value by a digital communication interface such as I²C, and the actuation unit 540 receives a voltage signal. A digital-to-analog conversion circuit, such as a pulse width modulation circuit can be disposed before the amplifier 530. Or, a micro-controller with pulse width modulation function is used to generate a pulse width modulation signal which is further converted into a suitable voltage signal by the amplifier 530. As indicated in FIG. 3A, the implementation of the control value is not limited to the above exemplifications.

Figure 6:
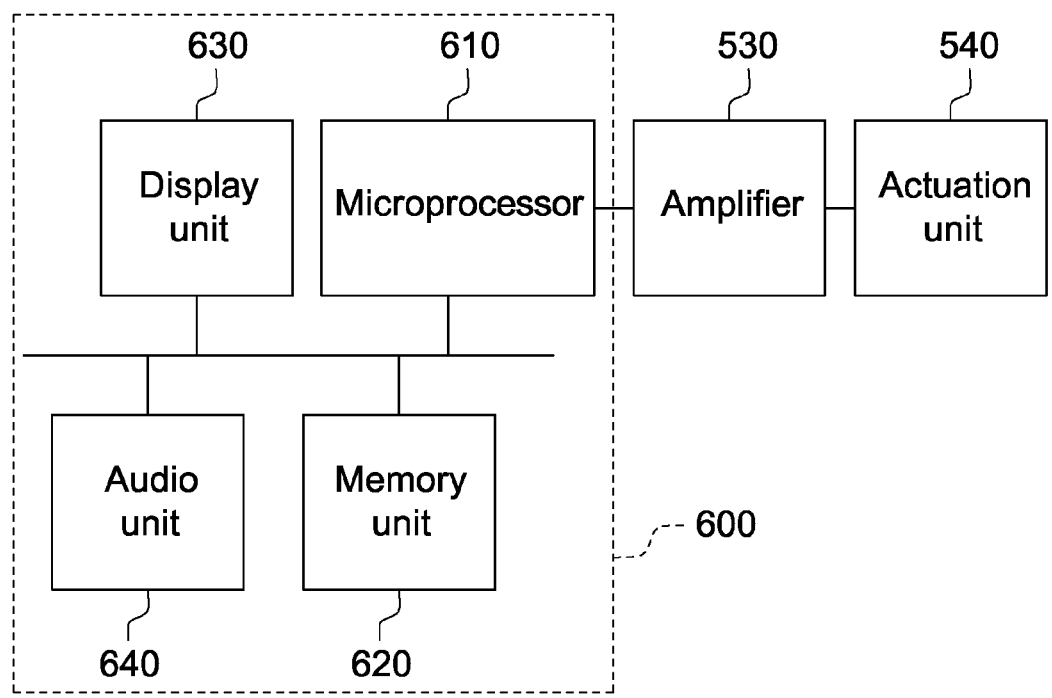
FIG. 6 shows an alternative embodiment of an electronic apparatus with haptic feedback.

The embodiment of FIG. 6 shows the example of FIG. 5B combined with the circuit 600 of the electronic apparatus. The circuit 600 includes a microprocessor 610, a memory unit 620, a display unit 630 and an audio unit 640, wherein the microprocessor 610 implements the control unit 510B, and the coupling method between the units is based on actual needs and is not limited to the above exemplifications. Thus, the user can interact with the electronic apparatus through the user interface with audio, video and haptic feedback function.

The actuation unit 540, which includes one to multiple actuation units, can be disposed in the electronic apparatus 100 for enabling the totality of the electronic apparatus 100 or the display, such as the display 110, of the display unit 630 to generate vibration. The display 110 realized by a touch panel provides the user interface 115 for touch input, and at the same time provides haptic feedback function. For example, the display 110 can simulate the press keys or multiple interface operation events and generate haptic feedback accordingly. The actuation unit can be realized by such as a motor, a piezoelectric element or other materials or devices capable of generating vibration, wherein the piezoelectric element provides prompt response time. In an embodiment, one or multiple actuation units are disposed at different positions of the electronic apparatus 100, and multiple amplifiers 530 are correspondingly used to generate vibration according to the haptic driving signal. Besides, the control unit can be implemented to generate corresponding haptic driving signals with respect to multiple actuation units to achieve different effects.

The dynamic range compression module 520, the dynamic range compression unit 550, the control unit 510B or other implementations can all be used for implementing the method for providing haptic feedback and the embodiment thereof as indicated in FIG. 3B. When applying dynamic range compression, the hardware unit or module adjusts the initial corresponding value according to the at least a haptic command, the initial corresponding value and a gain to generate a control value so as to control the magnitude of haptic feedback to be substantially within vibration range. Besides, in the course of adjusting the initial corresponding value to generate control value, the gain value may vary as indicated in FIGS. 4A to 4D so as to implement various mechanisms such as attack mechanism, release mechanism, input-look-ahead mechanism or soft clipping method. In addition, the above mechanisms can have various combinations such as the combination of attack and release mechanism, and the combination of input-look-ahead mechanism and release mechanism. In addition, soft clipping method can be used in the above combinations.

Figure 7:
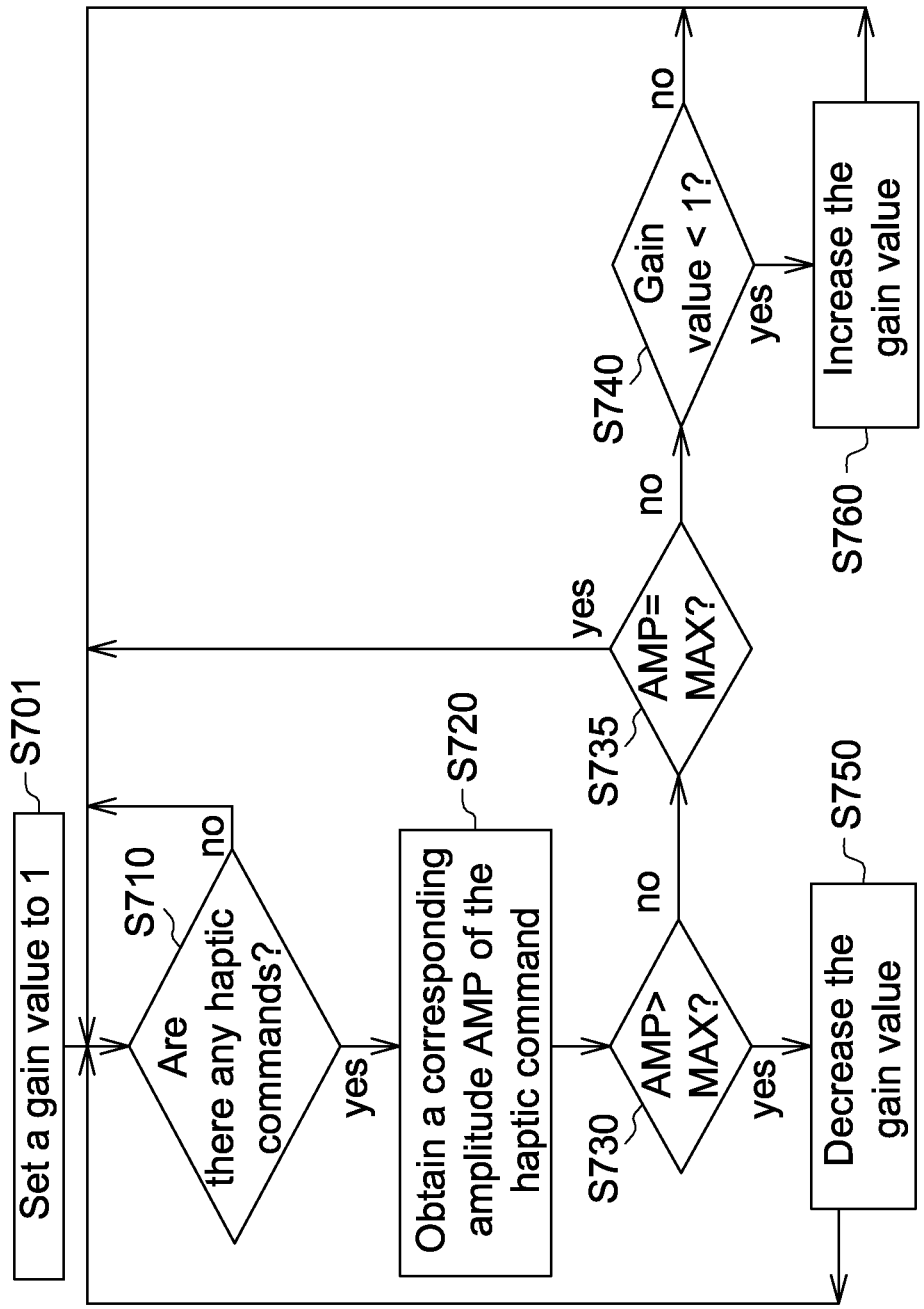
FIG. 7 shows a flowchart of an embodiment of performing dynamic range compression to the initial corresponding value of a haptic command through attack and release mechanism.

FIG. 7 shows an embodiment of applying dynamic range compression by the control unit 510B or dynamic range compression module 520 through attack and release mechanism. According to the present embodiment, with respect to the received haptic command, the combination (such as the summation) of one or multiple haptic commands, the initial corresponding value is dynamically checked and adjusted with time through dynamic range compression so as to make the magnitude of haptic feedback substantially within a vibration range, so that distortion can be avoided. Firstly, the method begins at the step S701, the gain value is set to 1. Next, the method proceeds to the step S710, whether a haptic command exists is checked. If so, then the method proceeds to the step S720, the maximum value of the amplitude (that is, the initial corresponding value) corresponding to the haptic command is obtained and denoted as the amplitude AMP. Then, the method proceeds to step S730, whether the amplitude AMP is greater than a threshold value MAX is checked. If so, then the method proceeds to step S750, the gain value is decreased; otherwise, the method proceeds to step S735, whether the amplitude AMP is equal to the threshold value MAX is checked. If the amplitude AMP is equal to the threshold value, then the method returns to step S710. If the determination in step S735 is negative, then the method proceeds to step S740, whether the gain value is less than 1 is checked. If the determination in step S740 is affirmative, then the method proceeds to step S760, the gain value is increased. In the above example, the control unit adjusts the magnitude of haptic feedback (represented by the control value) corresponding to the haptic command by dynamically adjusting the gain value so as to achieve the effect of dynamic range compression.

Figure 8:
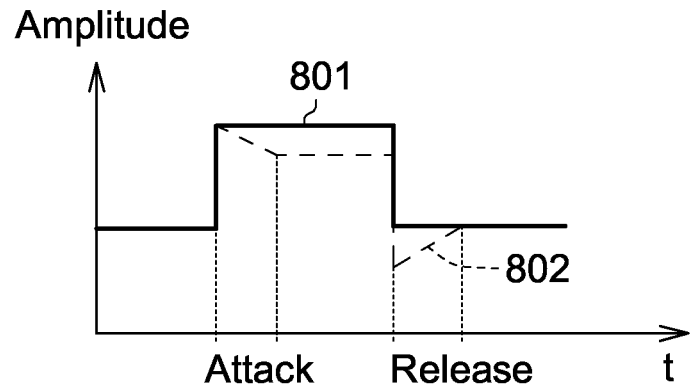
FIG. 8 shows an embodiment of performing dynamic range compression to the initial corresponding value of a haptic command through attack and release mechanism.

Then, dynamic range compression is applied. The method for attacking the gain and releasing the gain as indicated in the conversion processing of FIG. 8 can be added to step S750 or step S760 of the method of FIG. 7 so as to make the outputted value outside the target range to gradually approach the desired level. In FIG. 8, the curve 801 denotes the wave pattern of the original to-be-outputted haptic feedback, and after the dynamic range compression method of FIG. 7 is applied thereto, the result is the curve 802. At attack time and release time, the gain value is respectively decreased and increased gradually by different gain values, so as to improve the outputted haptic effect by adjusting attack and release time (such as between 1 to 100 ms) and attack gain and release gain (such as between −12 to 12 dB).

On the other hand, when applying dynamic range compression as indicated in FIG. 9, according to the principles of compressor, following the comparison between the control value of the inputted haptic command and the threshold value TH1, the control value of the inputted haptic command can be adjusted by hard/soft knee method so that the corresponding value of the input that exceeds the threshold value TH1 falls within the range between L2 and L1.

In other embodiments, the implementation of the control unit and the implementation related to dynamic range compression such as the implementation of the compressor can be design according to many different methods. For example, according to the feed-forward method like some of the above embodiments, the inputted haptic command is analyzed and processed so as to control the to-be-outputted result. According to the feedback method, the outputted result is used as a basis for controlling the current output result. According to the feed-forward-and-backward method, which combines the feed-forward method and the feed-feedback method, controls the to-be-outputted result.

Other embodiment further discloses a computer or processing device readable information storage medium on which programming code or one or multiple program modules are stored. The programming code is capable of implementing the method for providing haptic feedback disclosed in the above embodiments as indicated in FIG. 3B, FIGS. 4A to 4D, FIG. 7, 8 or 9. The computer or processing device readable information storage medium is exemplified by but not limited to optical storage medium, magnetic storage medium or memory such as memory card, firmware or ROM or RAM or programmable built-in memory of the microcontroller. Moreover, the above method can be implemented as a software driver or a program library for providing application programming interfaces.

In addition, the gain value of dynamic range compression using attack mechanism, release mechanism or input-look-ahead mechanism and corresponding conversion processing as indicated in FIGS. 4A to 4D can be set to other suitable values. The haptic feedback patterns and wave patterns exemplified above are only for exemplification purpose, not for limiting the implementation. In other embodiment, weighted processing or other function processing can be applied to the above initial corresponding values of multiple haptic commands so as to generate a control value, wherein each weight can be set to either the same coefficient or different coefficients, and the variation in these coefficients can be based on the gain value of attack, release or input-look-ahead mechanism as exemplified above.

The electronic apparatus with haptic feedback of the above embodiments has the mechanism of dynamic range compression, so that the haptic feedback generated by the electronic apparatus can generate vibration effect which improves user experience. In some embodiments, the electronic apparatus can simulate haptic feedback and produce delicate and multi-layered effect. Furthermore, under certain circumstances, the effect of combining multiple different haptic commands or gradually increasing the control value of a haptic command can avoid distortion caused by exceeding the dynamic range. In some embodiments, the user can perceive the vivid effect of haptic feedback, and the user's haptic feeling together with the user interface make user's interaction with the portable device even closer, bring about many new applications and functions to the electronic apparatus, and provide pleasant user experience to the user.

While the disclosure has been described by way of example and in terms of the exemplary embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for providing haptic feedback, comprising: providing an actuation unit to generate haptic feedback; and dynamically generating a control value to control the actuation unit to generate haptic feedback in response to at least a haptic command, wherein dynamic range compression is applied to dynamically generate the control value so as to control magnitude of haptic feedback to be substantially within a vibration range, wherein the step of dynamically generating a control value includes determining that an initial corresponding value of the at least a haptic command is substantially greater than a threshold value, and performing dynamic range compression to adjust the initial corresponding value to generate the control value, so as to control the magnitude of haptic feedback to be substantially within the vibration range; wherein in the step of performing dynamic range compression includes adjusting the initial corresponding value according to the at least a haptic command, the initial corresponding value, and a gain to generate the control value so as to control the magnitude of haptic feedback to be substantially within the vibration range; wherein the gain gradually diminishes within a period of time until the adjusted initial corresponding value of the at least a haptic command is less than the threshold value; wherein performing dynamic range compression further includes releasing the gain to make the gain gradually increase within a period of time when the adjusted initial corresponding value of the at least a haptic command is less than the threshold value.

2. The method for providing haptic feedback according to claim 1, further comprising:
performing soft clipping on the initial corresponding value of the at least a haptic command when the initial corresponding value exceeds the threshold value so as to generate the control value accordingly.

3. The method for providing haptic feedback according to claim 2, wherein the step of performing dynamic range compression uses soft clipping method with hard knee or soft knee so as to generate the control value accordingly.

4. The method for providing haptic feedback according to claim 1, wherein the step of dynamically generating a control value to control the actuation unit to generate haptic feedback comprises:
in response to the at least a haptic command, generating an initial corresponding value and temporarily storing the initial corresponding value;
dynamically checking with time whether a current initial corresponding value and the temporarily stored initial corresponding value are greater than the threshold value; and
if the current initial corresponding value exceeds the threshold value, performing dynamic range compression on the current initial corresponding value and the temporarily stored initial corresponding value to generate the control value so as to control the magnitude of haptic feedback to be substantially within the vibration range.

5. The method for providing haptic feedback according to claim 1, wherein each of the at least a haptic command corresponds to an object displayed on a user interface of an electronic apparatus.

6. The method for providing haptic feedback according to claim 1, wherein one of the at least a haptic command corresponds to at least a touch input received by a user interface of an electronic apparatus.

7. The method for providing haptic feedback according to claim 1, the method further comprising:
providing two envelope curves that correspond to two initial corresponding values of two haptic commands of concurrent events;
combining the two envelope curves to obtain an resulting envelope curve that corresponds to the initial corresponding values of the two combined haptic commands; and
applying the dynamic range compression to the resulting envelope curve to thereby dynamically generate the control value.

8. An electronic apparatus with haptic feedback, comprising: an actuation unit, which generates haptic feedback; and a control unit coupled to the actuation unit to dynamically generate a control value in response to at least a haptic command to control the actuation unit to generate haptic feedback, wherein the control unit applies dynamic range compression to dynamically generate the control value so as to control magnitude of haptic feedback to be substantially within a vibration range, wherein the control unit is configured to perform dynamic range compression to adjust an initial corresponding value of the at least a haptic command to generate the control value, so as to control the magnitude of haptic feedback to be substantially within the vibration range upon determining that the initial corresponding value of the at least a haptic command is greater than a threshold value, to adjust the initial corresponding value according to the at least a haptic command, the initial corresponding value, and a gain to generate the control value, so as to control the magnitude of haptic feedback to be substantially within the vibration range, to make the gain gradually diminish within a period of time until the adjusted initial corresponding value of the at least a haptic command is less than the threshold value, and to release the gain to make the gain gradually increase within another period of time when the adjusted initial corresponding value of the at least a haptic command is less than the threshold value.

9. The electronic apparatus for providing haptic feedback according to claim 8, wherein the control unit performs soft clipping on the initial corresponding value of the at least a haptic command when the initial corresponding value exceeds the threshold value so as to generate the control value accordingly.

10. The electronic apparatus for providing haptic feedback according to claim 9, wherein when the control unit performs dynamic range compression, using soft clipping with hard knee or soft knee so as to generate the control value accordingly.

11. The electronic apparatus for providing haptic feedback according to claim 8, wherein when the control unit performs dynamic range compression, the control unit further:
generates the initial corresponding value in response to the at least a haptic command and temporarily stores the initial corresponding value;
dynamically checks with time whether a current initial corresponding value and the temporarily stored initial corresponding value are greater than the threshold value; and
performs dynamic range compression on the current initial corresponding value and the temporarily stored initial corresponding value to generate the control value so as to control the magnitude of haptic feedback to be substantially within the vibration range if the current initial corresponding value exceeds the threshold value.

12. The electronic apparatus with haptic feedback according to claim 8, further comprising: an amplifier coupled between the control unit and the actuation unit.

13. The electronic apparatus with haptic feedback according to claim 8, wherein the electronic apparatus further comprises:
a display device, which displays at least an object corresponding to the at least a haptic command.

14. The electronic apparatus with haptic feedback according to claim 8, wherein the electronic apparatus further comprises:
a touch display device, wherein at least a touch input received by the touch display device corresponds to one of the at least a haptic command.

15. The electronic apparatus for providing haptic feedback according to claim 8, wherein:
the control unit is configured to combine two envelope curves that correspond to two initial corresponding values of two haptic commands of concurrent events, to thereby obtain an resulting envelope curve that corresponds to the initial corresponding values of the two combined haptic commands, and to apply the dynamic range compression to the resulting envelope curve to thereby dynamically generate the control value.

16. An electronic apparatus with haptic feedback, comprising: an actuation unit, which generates haptic feedback; a control unit; and a dynamic range compression unit, coupled to the control unit and the actuation unit, to dynamically generate a control signal in response to at least a haptic command to control the actuation unit to generate haptic feedback, wherein the dynamic range compression unit applies dynamic range compression to dynamically generate the control signal so as to control magnitude of haptic feedback to be substantially within a vibration range, wherein the dynamic range compression unit is configured to perform dynamic range compression to adjust an initial corresponding value of the at least a haptic command to generate a control value indicated by the control signal, so as to control magnitude of haptic feedback to be substantially within the vibration range upon determining that the initial corresponding value of the at least a haptic command is greater than a threshold value, to adjust the initial corresponding value according to the at least a haptic command, the initial corresponding value, and a gain to generate the control value, so as to control the magnitude of haptic feedback to be substantially within the vibration range, to make the gain diminish within a period of time until the adjusted initial corresponding value of the at least a haptic command is less than the threshold value, and to release the gain to make the gain gradually increase within another period of time when the adjusted initial corresponding value of the at least a haptic command is less than the threshold value.

17. The electronic apparatus for providing haptic feedback according to claim 16, wherein the dynamic range compression unit performs soft clipping on the initial corresponding value of the at least a haptic command when the initial corresponding value exceeds the threshold value so as to generate the control value accordingly.

18. The electronic apparatus for providing haptic feedback according to claim 17, wherein the dynamic range compression unit performs dynamic range compression, using soft clipping with hard knee or soft knee so as to generate the control value accordingly.

19. The electronic apparatus for providing haptic feedback according to claim 16, wherein when the dynamic range compression unit applies dynamic range compression, the dynamic range compression unit further:
generates the initial corresponding value in response to the at least a haptic command and temporarily stores the initial corresponding value;
dynamically checks with time whether a current initial corresponding value and the temporarily stored initial corresponding value are greater than the threshold value; and
performs dynamic range compression on the current initial corresponding value and the temporarily stored initial corresponding value to generate the control value so as to control the magnitude of haptic feedback to be substantially within the vibration range if the current initial corresponding value exceeds the threshold value.

20. The electronic apparatus with haptic feedback according to claim 16, wherein the dynamic range compression unit comprises a microcontroller.

21. The electronic apparatus with haptic feedback according to claim 20, wherein the dynamic range compression unit further comprises an amplifier.

22. The electronic apparatus with haptic feedback according to claim 16, further comprising:
an amplifier coupled between the dynamic range compression unit and the actuation unit.

23. The electronic apparatus for providing haptic feedback according to claim 16, wherein:
the control unit is configured to combine two envelope curves that correspond to two initial corresponding values of two haptic commands of concurrent events, to thereby obtain an resulting envelope curve that corresponds to the initial corresponding values of the two combined haptic commands, and to apply the dynamic range compression to the resulting envelope curve to thereby dynamically generate the control value.

* * * * *